(12) United States Patent
Nakahara

(10) Patent No.: US 9,176,935 B2
(45) Date of Patent: Nov. 3, 2015

(54) IMAGE FORMING APPARATUS CAPABLE OF DISPLAYING PRINT PREVIEW ON SCREEN

(71) Applicant: Hideo Nakahara, Osaka (JP)

(72) Inventor: Hideo Nakahara, Osaka (JP)

(73) Assignee: KYOCERA Document Solutions Inc. (JP)

( * ) Notice: Subject to any disclaimer, the term of this patent is extended or adjusted under 35 U.S.C. 154(b) by 93 days.

(21) Appl. No.: 13/745,137

(22) Filed: Jan. 18, 2013

(65) Prior Publication Data

US 2013/0188200 A1 Jul. 25, 2013

(30) Foreign Application Priority Data

Jan. 19, 2012 (JP) ................................ 2012-009398

(51) Int. Cl.
*G06K 15/02* (2006.01)
*G06F 17/21* (2006.01)

(52) U.S. Cl.
CPC .......... *G06F 17/212* (2013.01); *G06K 15/1817* (2013.01); *G06K 15/1822* (2013.01); *G06K 15/1825* (2013.01); *G06K 15/1849* (2013.01)

(58) Field of Classification Search
CPC .................................................. G06F 17/212
USPC ......................................................... 358/1.9
See application file for complete search history.

(56) References Cited

U.S. PATENT DOCUMENTS

| 6,288,789 B1 | 9/2001 | Harada | |
|---|---|---|---|
| 6,529,214 B1* | 3/2003 | Chase | G06Q 30/06 715/234 |
| 2010/0182637 A1* | 7/2010 | Tamura | H04N 1/40068 358/1.15 |
| 2010/0321713 A1* | 12/2010 | Nishikawa | G06K 15/02 358/1.9 |

FOREIGN PATENT DOCUMENTS

| JP | 07-040608 | 2/1995 |
|---|---|---|
| JP | 2004-021683 | 1/2004 |

* cited by examiner

*Primary Examiner* — Peter K Huntsinger
*Assistant Examiner* — Bharatkumar Shah
(74) *Attorney, Agent, or Firm* — McDonnell Boehnen Hulbert & Berghoff LLP

(57) ABSTRACT

An image forming apparatus includes: an image data generation unit configured to write at least one of image data for print output and image data for confirmation display based on intermediate data on an object included in print data and store the image data in a buffer; an intermediate data generation unit configured to generate the intermediate data based on comparing a resolution or gradation of a target object with an output resolution or output gradation that is defined based on a size of the buffer, adjusting a resolution to either the resolution of the target object or the output resolution and adjusting gradation to either the gradation of the target object or the output gradation; a printing unit configured to print using the image data for print output; and a display unit configured to display a print preview.

11 Claims, 4 Drawing Sheets

IMAGE FORMING APPARATUS CAPABLE OF DISPLAYING PRINT PREVIEW ON SCREEN

REFERENCE TO RELATED APPLICATIONS

This application is based upon and claims the benefit of priority from the corresponding Japanese Patent Application No. 2012-009398, filed in the Japan Patent Office on Jan. 19, 2012, the entire contents of which are incorporated herein by reference.

BACKGROUND

1. Field of the Invention

Unless otherwise indicated herein, the description in this background section is not prior art to the claims in this application and is not admitted to be prior art by inclusion in this section. The present disclosure relates to an image forming apparatus that has a print function and is capable of displaying a print preview on a screen.

2. Description of the Related Art

A typical printing system can display a print preview on a monitor screen.

Specifically, a bitmap image (image data) generated for printing by a printer apparatus is returned to a host computer, thereby enabling the print preview to be displayed on a monitor connected to the host computer.

According to such a printing system, a print result can be confirmed before execution of the printing.

Incidentally, the number of gradation levels of color per pixel that can be reproduced by a display device such as a monitor or a liquid crystal panel is larger than the number of gradation levels of the printer apparatus. In some instances, the number of gradation levels produced by the printer apparatus may be shown by increasing or decreasing dots.

For example, a printer apparatus generally known to output high gradation reproduces color tones normally by no more than 16 gradation levels (gradation values of 0 to 15) for each of the CMYK colors. Alternatively, the monitor can reproduce an abundance of colors by combining color values of as many as 256 gradation levels (gradation values of 0 to 255) for each of the RGB colors.

Therefore, assuming that it is desirable to print a high-gradation image, the typical printer apparatus generates image data for print output by lowering the gradation of the image. When the image data, with lowered gradation, is used to display the image for confirmation before printing, the print preview is displayed on the monitor screen with rough colors.

If the print preview can be generated while maintaining the gradation of an object, it is possible to faithfully reproduce the original color tones.

When a high-gradation image object is developed into bitmap data with its gradation maintained, an amount of data thereof becomes large. Therefore, it is necessary to increase the capacity of a memory corresponding thereto.

Further, high-gradation image data exceeding the output gradation cannot be used for print output as it is. Rather, at a time of printing, it is necessary to generate the image data for print output corresponding to the output gradation.

It should be noted that in order to save a memory usage amount, a method that uses the print preview having a low resolution is conceivable, but it is difficult to define a reference to which the resolution is lowered. Further, if the resolution is uniformly lowered for individual objects, reproducing the objects may be difficult depending on attributes of the respective objects.

SUMMARY

An image forming apparatus according to an embodiment of the present disclosure includes an image data generation unit, an intermediate data generation unit, a printing unit, and a display unit. The image data generation unit is configured to write at least one of the following: (i) image data for a print output and (ii) image data for a confirmation display based on intermediate data on an object included in print data, and store the image data in a buffer. The intermediate data generation unit is configured to perform at least one of the following: generate the intermediate data based on comparing a resolution of a target object, and adjust a resolution to either the resolution of the target object or the output resolution, where the output resolution is defined based on a size of the buffer; and generate the intermediate data based on comparing gradation of the target object with an output gradation, and adjust gradation to one of the gradation of the target object and the output gradation, where the output gradation is defined based on the size of the buffer. The printing unit is configured to print using the image data for print output. The display unit is configured to display a print preview using the image data for confirmation display.

A non-transitory computer-readable recording medium according to an embodiment of the present disclosure stores an image forming program to be executed by a computer of an image forming apparatus. The image forming program includes first, second, third, and fourth program codes. The first program code causes the computer to write at least one of the following: (i) image data for a print output and (ii) image data for a confirmation display based on intermediate data on an object included in print data, and store the image data in a buffer. The second program code causes the computer to perform at least one of the following: generate the intermediate data based on comparing a resolution of a target object with an output resolution, and adjust a resolution to either the resolution of the target object or the output resolution, where the output resolution is defined based on a capacity of the buffer; and generate the intermediate data based on comparing gradation of the target object with output gradation, and adjust gradation to either the gradation of the target object or the output gradation, where the output gradation is defined based on the capacity of the buffer. The third program code causes the computer to print using the image data for print output. The fourth program code causes the computer to display a print preview using the image data for confirmation display.

An image forming method according to an embodiment of the present disclosure includes: (i) writing, by an image data generation unit, at least one of image data for a print output and image data for confirmation display based on intermediate data on an object included in print data, and storing the image data in a buffer; (ii) performing, by an intermediate data generation unit, at least one of the following: generating the intermediate data based on comparing a resolution of a target object with an output resolution and adjusting a resolution to either the resolution of the target object or the output resolution, wherein the output resolution is defined based on a size of the buffer; and generating the intermediate data based on comparing gradation of the target object with output gradation, and adjusting gradation to either the gradation of the target object or the output gradation, where the output gradation is defined based on the size of the buffer; (iii)

printing, by a printing unit, using the image data for print output; and (iv) displaying, by a display unit, a print preview using the image data for confirmation display.

Additional features and advantages are described herein, and will be apparent from the following Drawings and the Detailed Description.

DETAILED DESCRIPTION (Printing System)

Figure 1:
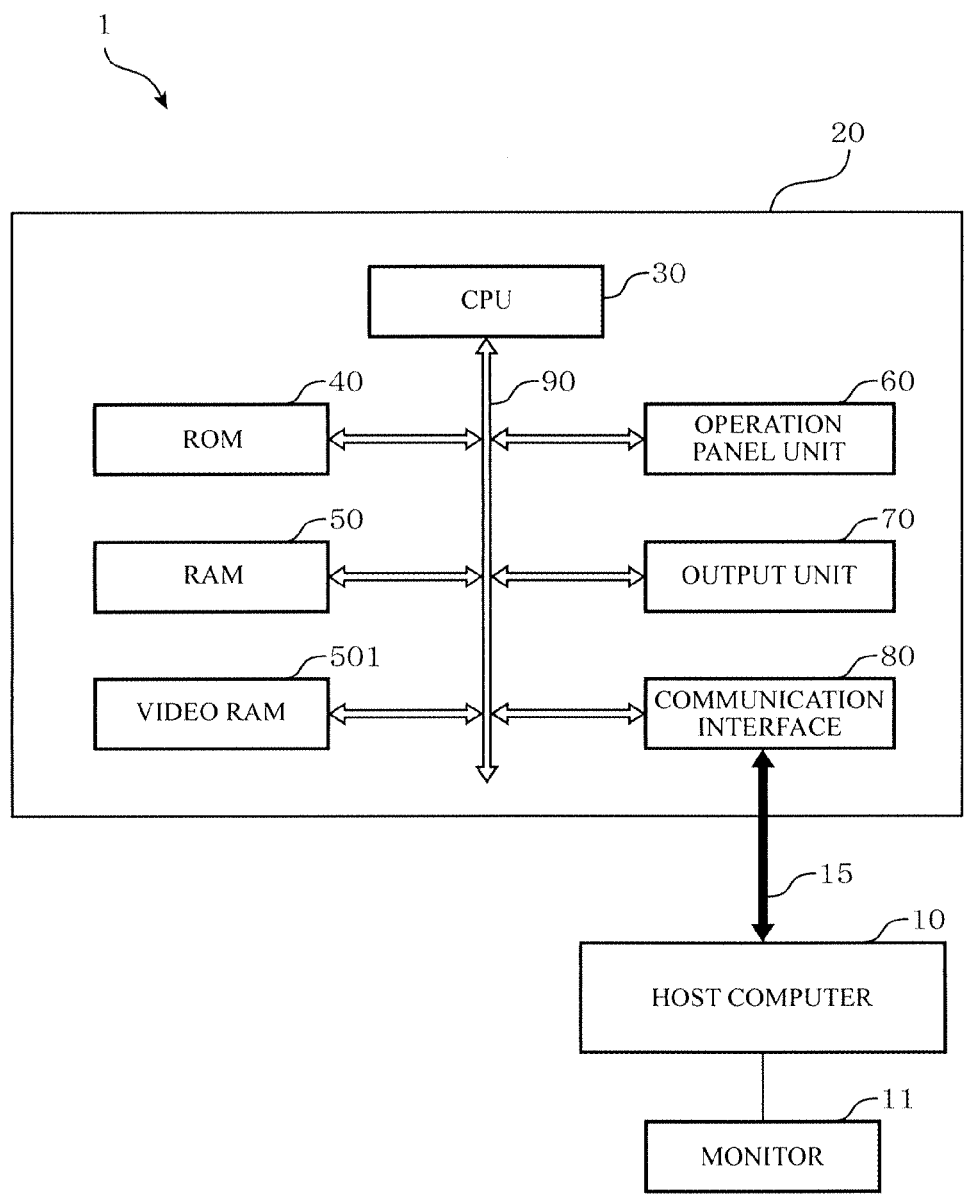
FIG. 1 illustrates a printing system including an image forming apparatus according to an embodiment of the present disclosure and a host computer.

FIG. 1 illustrates a printing system including an image forming apparatus according to an embodiment of the present disclosure and a host computer.

As illustrated in FIG. 1, for example, the present disclosure is applied to printing system 1 configured so that an image forming apparatus 20 and host computer 10 are communicably connected to each other via network 15, such as a LAN.

In this printing system 1, image forming apparatus 20 is a printer apparatus that prints based on print data supplied from host computer 10. Image forming apparatus 20 includes central processing unit (CPU) 30, read only memory (ROM) 40, random access memory (RAM) 50, video RAM 501, operation panel unit (first display unit) 60, output unit (printing unit) 70, communication interface 80, and bus 90. CPU 30 controls a whole apparatus and performs various kinds of arithmetic processing. ROM 40 stores a program and data. RAM 50 temporarily stores the program and the data as a work memory. Video RAM 501 stores image data for print output and image data for confirmation display respectively in different buffer areas. Operation panel unit 60 displays various kinds of information and inputs various instructions. Output unit 70 prints various kinds of data on a recording medium such as paper by using an image formation process, such as an electrophotographic process. Communication interface 80 such as a LAN card connects to network 15. Some or all the elements described above may be connected to one another via bus 90.

Host computer 10 is connected to monitor (second display unit) 11 and can display various kinds of print-related setting information, operation information, and the like on a screen.

Figure 2:
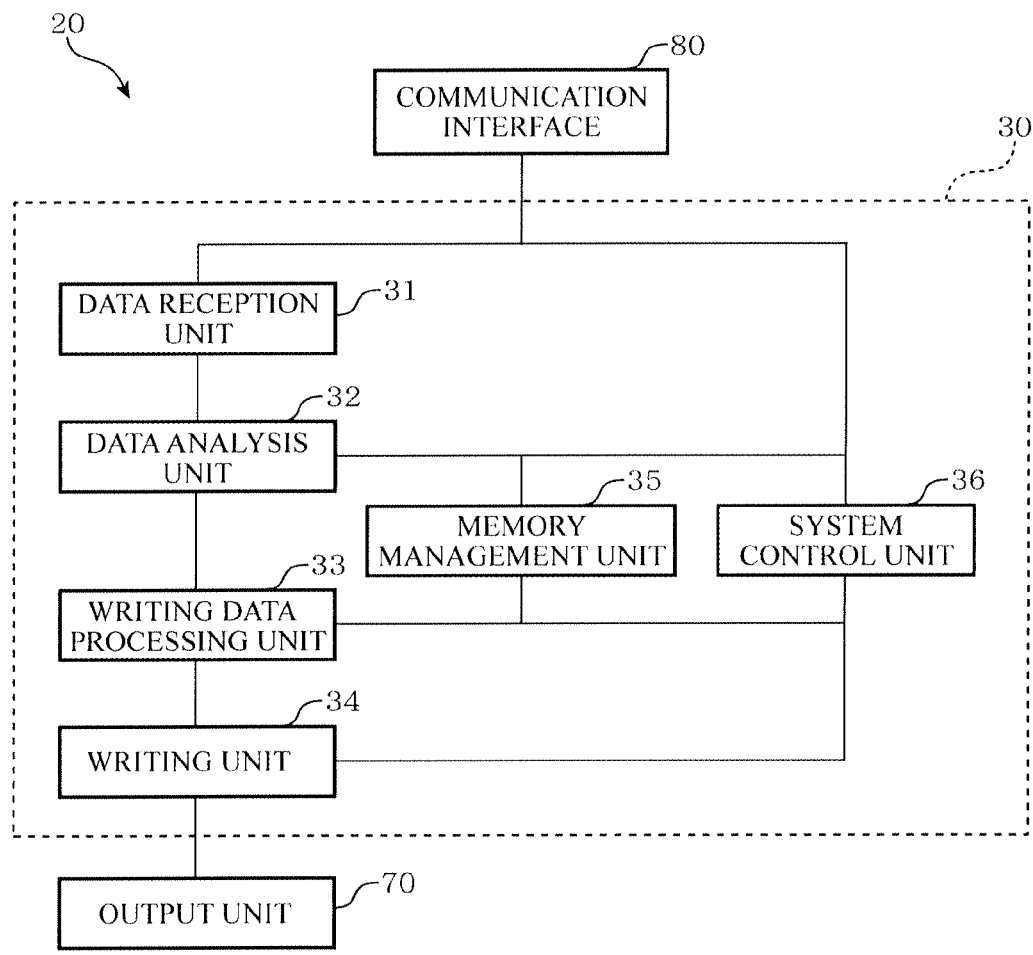
FIG. 2 illustrates a configuration of the image forming apparatus according to the embodiment of the present disclosure.

FIG. 2 illustrates a functional configuration of the image forming apparatus according to the embodiment of the present disclosure.

In some embodiments, as illustrated in FIG. 2, image forming apparatus 20 includes data reception unit 31, data analysis unit 32, writing data processing unit (intermediate data generation unit) 33, writing unit (image data generation unit) 34, memory management unit 35, and system control unit 36. Some or all the elements described above may perform based on functions processed or implemented by CPU 30. Data reception unit 31 receives the print data via communication interface 80. Data analysis unit 32 analyzes the print data received from data reception unit 31. Writing data processing unit 33 generates a display list (DL) as intermediate data of respective objects of a writing target. In some instances, writing processing unit 33 may generate the display list according to an instruction issued from data analysis unit 32. Based on the display list generated by writing data processing unit 33, writing unit 34 generates bitmap images (image data) of the respective objects and performs writing thereof in the buffer area of a video RAM. Memory management unit 35 manages the memory of a system. System control unit 36 manages common information on the system and controls the system. Image forming apparatus 20 causes output unit 70 to print on the recording medium based on the image data generated by writing unit 34.

In some embodiments, writing data processing unit 33 may generate intermediate data. Further, in some instances, writing data processing unit 33 may generate the intermediate data based on comparing a resolution or gradation of a target object with an output resolution or output gradation. In such instances, the output resolution or output gradation may be defined based on a capacity of a buffer. Yet further, in some embodiments, writing data processing unit 33 may generate the intermediate data by adjusting the resolution to the resolution of the object or the output resolution and further adjusting the gradation to the gradation of the object or the output gradation.

In some embodiments, the term "display list" represents the intermediate data generated at a stage before generation of the image data for the purpose of unifying data formats. For possible examples, the "display list" may be obtained by generating: (1) an operator for text writing and data thereon, (2) an operator for graphics writing and data thereon, and (3) an operator for print preview writing and data thereon, possibly in a list format for each band. In other words, the "display list" is used to store a group of commands relating to the writing collectively in a list format for effective processing at a time of execution of writing.

The resolution is changed by reducing or enlarging a size of an object image. Therefore, when adjusting the object having a high resolution to the output resolution, the display list having a low resolution is generated by reducing the size of the object.

Writing unit 34 generates any one or both of the image data for print output and the image data for confirmation display. Writing unit 34 may generate the data depending on the purpose, possibly based on the display list being the intermediate data.

Specifically, bitmap data is generated based on the display list, and is written in a buffer for print output or a buffer for confirmation display of the video RAM.

When generating the image data for print output based on the display list, the image data whose gradation is adjusted to the output gradation (for example, 16 gradation levels) can be generated by applying a screen for output to color information and effecting halftone processing or the like.

On the other hand, when generating the image data for confirmation display, the image data is written while maintaining the gradation of the color information. This is for an improvement in reproducing the image for gradation of a print preview.

Writing unit 34 generates, based on the display list having a lower resolution, the image data that matches the resolution by using, for example, the following method.

When generating the image data for the display list having information on the size reduced to ½, ¼, or the like, writing unit 34 picks off pixels (e.g., removes, combines, or replaces pixels) while buffering the image data for the video RAM, or synthesizes colors of a plurality of pixels that are overlapped with one another due to the reduction.

When the display list is formed of a plurality of bands, writing unit 34 compresses the image. In general, the image data for confirmation display may be subject to lossy compression such as Joint Photographic Experts Group (JPEG) without causing problematic deterioration of the image. Therefore, when subjected to the compression, the lossy compression is performed by dividing the buffer into blocks. After the processing is finished for all the bands, the image data for confirmation display is generated by joining the compressed blocks.

In some instances, the resolution of the object is higher than the output resolution defined based on the size of the buffer. As such, writing data processing unit 33 can adjust the resolution to the output resolution. Further, writing data processing unit 33 can generate the display list while maintaining the gradation at the gradation of the object.

In other words, it is possible to generate the intermittent data that can be used both for print output and for confirmation display. In the intermediate data, it is possible to lower the resolution while maintaining the gradation.

For example, if the processing is to be performed on an image object whose resolution is 600 dot per inch (dpi) and whose gradation is 256 gradation levels when the output resolution is 300 dpi, writing data processing unit 33 generates the display list by setting the resolution to 300 dpi (output resolution) and the gradation to 256 gradation levels (gradation of the object).

The generated display list is output to writing unit 34 to generate the image data for print output or the image data for confirmation display, and each set of the image data is stored in the buffer of the video RAM.

When the image data is stored in the buffer for print output, system control unit 36 extracts the image data for print output from this buffer and causes output unit 70 to print thereof. After the image data is stored in the buffer for confirmation display, system control unit 36 extracts the image data for confirmation display from this buffer and causes an operation panel unit to display the print preview. In some instances, system control unit 36 outputs the image data to the host computer via communication interface 80 and causes the monitor to display the print preview.

In this manner, with limitations of the output gradation or the output resolution imposed on the image data for print output, the intermediate data is generated by lowering the resolution to the output resolution while maintaining the gradation at the stage before generating the image data.

Further, the image data is generated by lowering the gradation to the output gradation at a time of printing, and the image data is generated while maintaining the gradation when displaying the print preview.

Therefore, the intermediate data generated while maintaining the gradation can be used for the generating different pieces of image data used for different purposes.

Accordingly, even for a high-gradation image, the print preview can be displayed without lowering the gradation while suppressing a memory usage amount.

(Method of Generating Display List)

In the following, a description is made of a method of generating the display list performed by a writing data processing unit.

Figure 3:
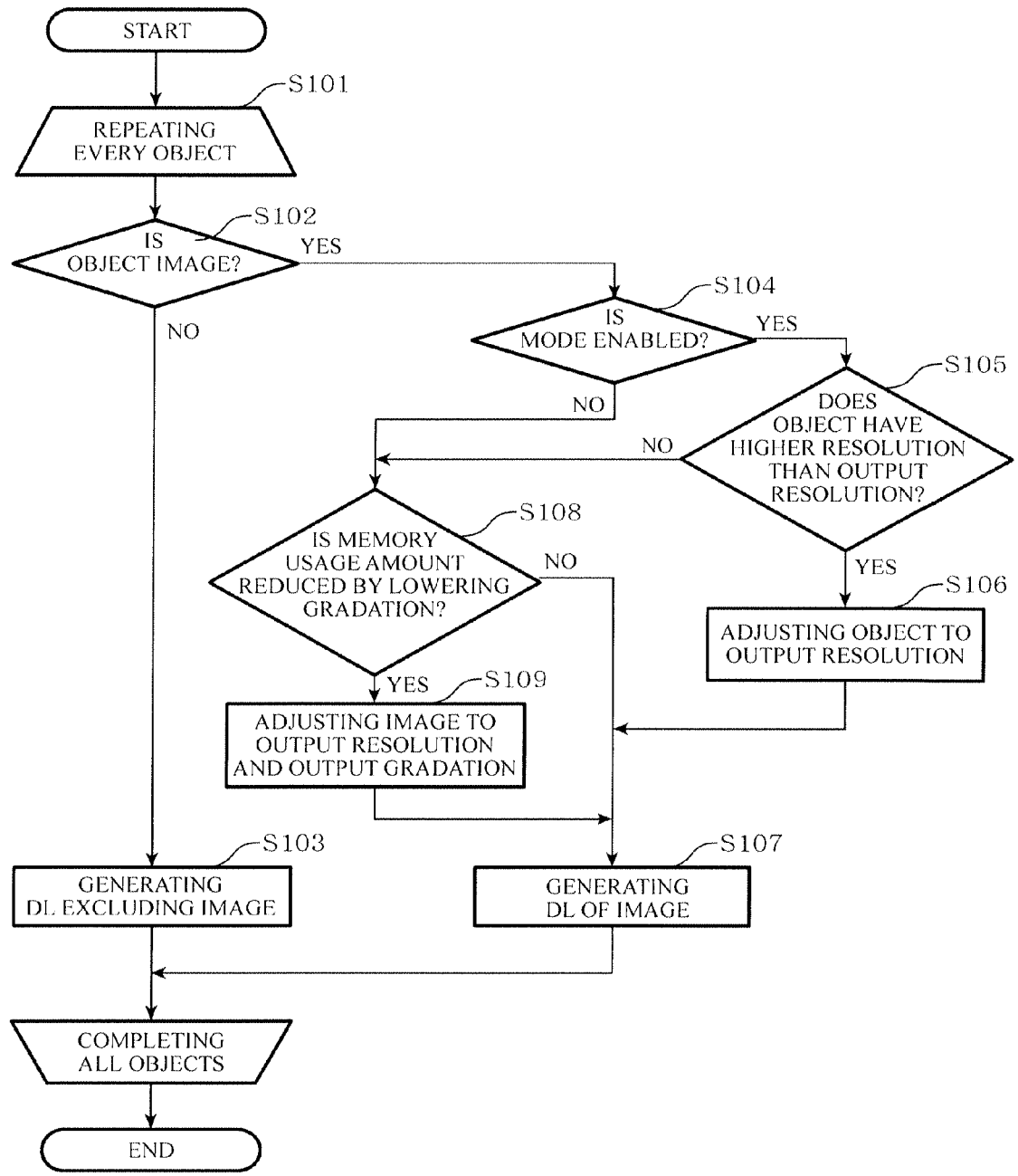
FIG. 3 illustrates a flow chart for processing and generating a display list.

FIG. 3 illustrates a flow chart for processing and generating the display list.

As illustrated in FIG. 3, for example, the writing data processing unit executes loop processing of Steps 102 to 109 for each of objects included in print data transmitted from the host computer and received via a communication interface (Step 101).

First, the writing data processing unit determines whether or not each of objects included in a given page is an image such as a photograph on an object-to-object basis (Step 102).

For a non-image object, the writing data processing unit generates a display list excluding the image (Step 103). In other words, for text or graphics, the display list is generated as intermediate data for each of text and graphics, separately from the image.

If the object is an image, the writing data processing unit enables or disables a mode for displaying the print preview (Step 104).

It should be noted that this "mode" indicates whether or not to generate (display) the image data on a confirmation display. Further, this mode can be switched by inputting an operation signal corresponding to the user's operation through the operation panel unit (mode switching unit).

When the mode is enabled, the writing data processing unit determines whether or not the object is an image with a higher resolution than the output resolution (Step 105).

When it is determined that the object has a higher resolution than the output resolution, the writing data processing unit reduces the resolution of the image by adjusting the resolution of the object to the output resolution (S106), and generates the display list of the image (Step 107).

When the mode is disabled, or if the object is an image has a lower resolution than the output resolution when the mode is enabled, the writing data processing unit determines whether or not the amount of memory usage can be reduced by lowering the gradation (Step 108).

More specifically, it is determined on an image-to-image basis whether the amount of memory usage can be reduced. In some instances, the amount of memory can be reduced by performing the reduction by lowering the resolution and the gradation of each of the images included in a target page. Further, the target page may be adjusted to the output resolution and the output gradation. Alternatively, the amount of memory usage can be reduced by maintaining the resolution and the gradation of the image as they are.

In other words, it is determined whether or not an amount of the image data should be written based on the intermediate data. In some instances, the amount of image data becomes smaller when generating the intermediate data by adjusting the gradation and the resolution of the object to the output gradation and the output resolution. Further, the amount of image data may become smaller than when compared to generating the intermediate data with maintaining the gradation and the resolution.

If it is determined that the memory usage amount can be reduced by lowering the gradation, the writing data processing unit adjusts the resolution and the gradation of the image to the output resolution and the output gradation (Step 109), and generates the display list of the image (Step 107).

If it is determined that the memory usage amount cannot be reduced even by lowering the gradation, the writing data processing unit generates the display list of the image with the resolution and the gradation maintained at the resolution and the gradation of the object (Step 107).

(Method of Writing Display List)

Next, a description is made of a method of writing the display list performed by the writing unit.

Figure 4:
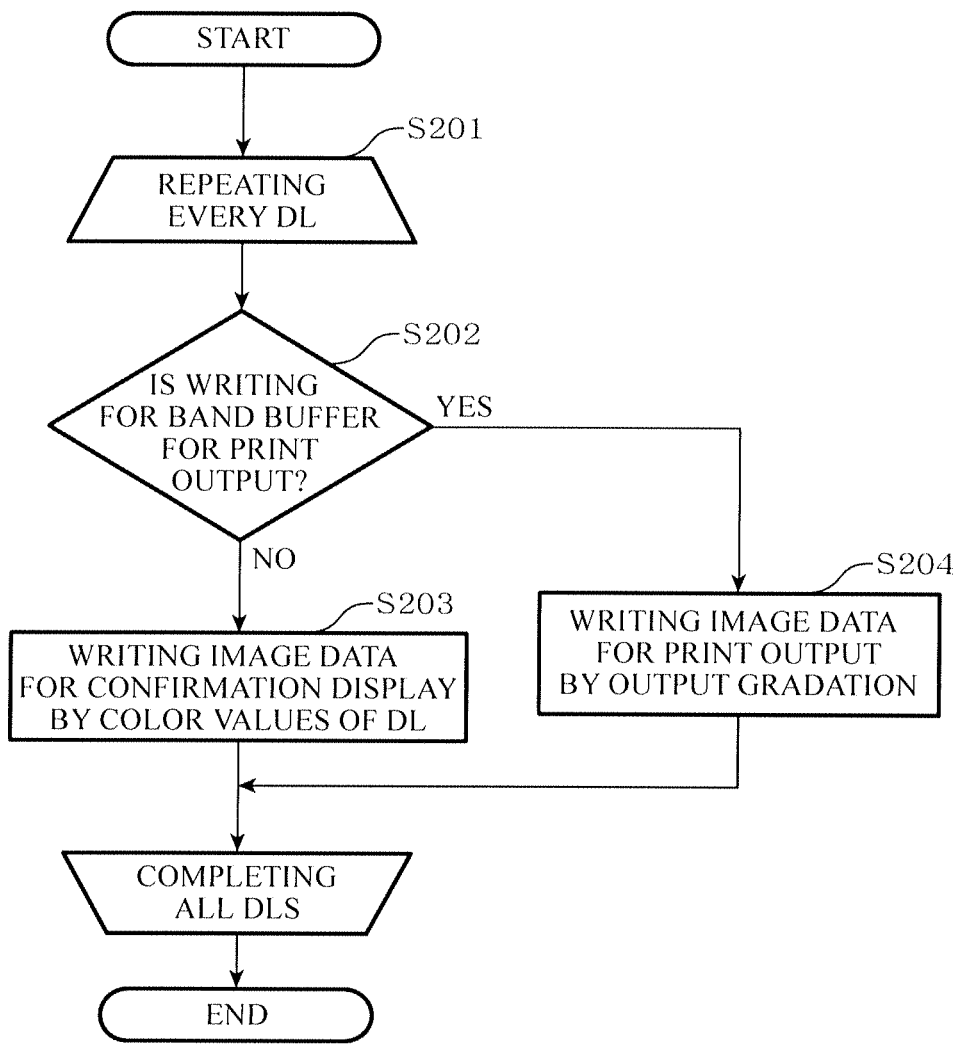
FIG. 4 illustrates a flow chart for processing and writing the display list.

FIG. 4 illustrates a flow chart for processing and writing the display list.

As illustrated in, for example, FIG. 4, the writing unit executes loop processing of Steps 202 to 204 for each of the display lists generated by the writing data processing unit (Step 201).

First, the writing unit verifies whether or not the writing is to be performed for the band buffer for print output (Step 202). In other words, it is verified whether the printing is to be performed or the print preview is to be displayed.

If the writing is not to be performed for the band buffer for print output, in other words, if the writing is to be performed for the buffer for confirmation display, the writing unit writes the image data in the buffer for confirmation display by using color values of the display list (Step 203). Then the print preview is displayed.

If the writing is to be performed for the band buffer for print output, the writing unit writes the image data in the buffer for print output. In some instances, the writing unit writes the image data by applying the output for the screen to the color values. In some instances, this application may lower the gradation to the output gradation (Step 204). Then the image data is printed.

It should be noted that when the image data for confirmation display is not to be written, the display list is released at a point in time when the writing for the buffer is finished. In some instances, if only the image data for print output is to be written, the display list thereof is unnecessary. With such a configuration, it is possible to further improve efficiency in memory usage.

In this manner, according to the image forming apparatus of this embodiment, when the mode for displaying the print preview is enabled, if it is determined that the object has a higher resolution than the output resolution, the display list is generated by reducing the object corresponding to the output resolution.

In other words, while the gradation is maintained in the intermediate data, the image data is developed for printing or displaying at the time of the writing depending on the purpose.

Therefore, the image data for confirmation display can be generated while the memory usage amount is suppressed and high gradation is maintained.

Further, in some instances, the mode may be disabled. Yet further, the object may be an image having a lower resolution than the output resolution when the mode is enabled. Additionally, in some instances, it may be determined that the amount of memory usage can be reduced by lowering the gradation. As such, the writing unit may adjust the resolution and the gradation of the object to the output resolution and the output gradation, respectfully, and generate the display list of the image.

Further, if it is determined that the memory usage amount cannot be reduced even by lowering the gradation, the writing unit generates the display list with the resolution and the gradation maintained at the resolution and the gradation of the object, respectfully.

Therefore, even when performing only the printing without displaying the print preview, an amount of intermediate data can be suppressed to thereby improve the efficiency in memory usage.

(Image Forming Program)

Next, a description is made of an image forming program.

In some instances, an intermediate data generation function and an image data generation function may be implemented. For example, the image forming apparatus may include a computer according to the above-mentioned embodiment. In some instances, these functions may be implemented by an image forming program stored in the storage unit of the computer (for example, ROM or hard disk drive).

The image forming program is read by a control unit (such as a CPU) of the computer of the image forming apparatus, to thereby send an instruction to each of the components of the image forming apparatus and carry out the method of generating the display list and the method of writing the display list that are described above.

Accordingly, the above-mentioned respective functions are implemented by cooperation of the image forming program being software and the respective components of the image forming apparatus being hardware resources.

It should be noted that the image forming program for implementing the above-mentioned respective functions is not only stored in the ROM or the hard disk drive of the image forming apparatus but can also be stored in a recording medium that can be read by the image forming apparatus, for example, an external storage device and/or a portable recording medium.

The external storage device represents an additional memory device that incorporates a recording medium such as a compact disc-read only memory (CD-ROM) and that is connected externally to the image forming apparatus. Meanwhile, the portable recording medium represents a portable recording medium that can be inserted to a recording media drive (drive device), for example, a flexible disk, a memory card, or a magneto-optical disk.

Specifically, referring to FIG. 1, the program stored in the recording medium is loaded into RAM 50 or the like of image forming apparatus 20 and executed by CPU 30. By execution thereof, the respective functions according to the above-mentioned embodiment are implemented.

When the image forming program is loaded onto image forming apparatus 20, image forming apparatus 20 can use a communication line to download the programs of other apparatus held thereby onto RAM 50 or the external storage device owned by itself. The downloaded programs are also executed by CPU 30 to thereby implement the respective functions according to the above-mentioned embodiment.

As described above, according to the image forming apparatus and the image forming program of this embodiment, it is possible to efficiently generate a high-gradation print preview while suppressing the memory usage amount and maintaining the gradation.

The image forming apparatus and the image forming program according to the present disclosure are described above with reference to the embodiment, but the present disclosure is not limited to the above-mentioned embodiment, and it should be understood that various changes can be made within the scope of the present disclosure.

The present disclosure can be applied to the image forming apparatus such as a printer.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
   an image data generation unit configured to write at least one of the following: (i) image data with an output resolution and an output gradation for a print output and (ii) image data for a confirmation display based on intermediate data of each object included in print data, and
store the image data in a buffer;
an intermediate data generation unit configured to perform
at least one of the following:
generate the intermediate data based on comparing a
resolution of a target object with the output resolution,
and adjust a resolution of the intermediate data to
either the resolution of the target object or the output
resolution, wherein the output resolution is defined
based on a size of the buffer; and
generate the intermediate data based on comparing a
gradation of the target object with the output gradation,
and adjust a gradation of the intermediate data to
either the gradation of the target object or the output
gradation, wherein the output gradation is defined
based on the size of the buffer;
a mode switching unit, wherein based on an input of an
operation signal for enabling or disabling a confirmation
display, the mode switching unit is configured to switch
a mode to generate the image data for the confirmation
display;
a printing unit configured to print using the image data for
print output; and
a display unit configured to display a print preview by using
the image data for confirmation display,
wherein the intermediate data includes at least one of first
intermediate data, second intermediate data, and third
intermediate data;
wherein the intermediate data generation unit determines
whether the mode is enabled or disabled, whether or not
the resolution of the target object is higher than the
output resolution, and whether or not an amount of the
image data can be reduced by adjusting the gradation of
the target object to the output gradation;
wherein if (i) the mode is enabled and (ii) the resolution of
the target object is higher than the output resolution, the
intermediate data generation unit is further configured to
generate the first intermediate data by adjusting the resolution
to the output resolution while maintaining the
gradation at the gradation of the target object;
wherein when generating the intermediate data corresponding
to the output gradation and the output resolution,
if the amount of the image data can be reduced by
adjusting the gradation of the target object to the output
gradation, and in a case where either: (i) the mode is
disabled or (ii) the mode is enabled and the resolution of
the target object is not higher than the output resolution,
the intermediate data generation unit is further configured
to generate the second intermediate data by adjusting
the resolution to the output resolution and adjusting
the gradation to the output gradation;
wherein when generating the intermediate data corresponding
to the output gradation and the output resolution,
if the amount of the image data cannot be reduced
by adjusting the gradation of the target object to the
output gradation, and in a case where either: (i) the mode
is disabled or (ii) the mode is enabled and the resolution
of the target object is not higher than the output resolution,
the intermediate data generation unit is further configured
to generate the third intermediate data by maintaining
the resolution at the resolution of the target
object and the gradation at the gradation of the target
object; and
wherein the image data generation unit is further configured
to:
write, based on the intermediate data that includes at
least one of the first intermediate data, the second
intermediate data, and the third intermediate data, the
image data for the print output with the output resolution
and the output gradation at a time of printing;
and
write, based on the intermediate data that includes at
least one of the first intermediate data, the second
intermediate data, and the third intermediate data, the
image data that matches a resolution used by the confirmation
display while maintaining the gradation at
the gradation of the intermediate data.

2. The image forming apparatus according to claim 1,
wherein if the target object includes an image object and a
non-image object, the intermediate data generation unit generates
specified one of the first intermediate data, the second
intermediate data, and the third intermediate data for the
image object, and separately generates intermediate data for
the non-image object.

3. The image forming apparatus according to claim 1,
wherein if the mode is enabled, the intermediate data generation
unit generates specified one of the first intermediate
data, the second intermediate data, and the third
intermediate data; and
wherein if the mode is disabled, the intermediate data
generation unit generates specified one of the second
intermediate data and the third intermediate data and
does not generate the first intermediate data.

4. A non-transitory computer-readable recording medium
having stored thereon an image forming program executable
by a computer of an image forming apparatus, the image
forming program comprising:
a first program code for causing the computer to write at
least one of the following: (i) image data with an output
resolution and an output gradation for a print output and
(ii) image data for a confirmation display based on intermediate
data of each object included in print data, and
store the image data in a buffer;
a second program code for causing the computer to perform
at least one of the following:
generate the intermediate data based on comparing a
resolution of a target object with the output resolution,
and adjusting a resolution of the intermediate data to
either the resolution of the target object or the output
resolution, wherein the output resolution is defined
based on a capacity of the buffer; and
generate the intermediate data based on comparing a
gradation of the target object with the output gradation,
adjusting a gradation of the intermediate data to
either the gradation of the target object or the output
gradation, wherein the output gradation is defined
based on the capacity of the buffer;
a third program code, wherein based on an input of an
operation signal for enabling or disabling a confirmation
display, the third program code causes the computer to
switch a mode to generate the image data for the confirmation
display;
a fourth program code for causing the computer to print
using the image data for print output; and
a fifth program code for causing the computer to display a
print preview using the image data for confirmation display,
wherein the intermediate data includes first intermediate
data, second intermediate data, and third intermediate
data;
wherein the second program code causes the computer to
determine whether the mode is enabled or disabled,
whether or not the resolution of the target object is
higher than the output resolution, and whether or not an amount of the image data can be reduced by adjusting the gradation of the target object to the output gradation;

wherein if (i) the mode is enabled and (ii) the resolution of the target object is higher than the output resolution, the second program code further causes the computer to generate the first intermediate data by adjusting the resolution to the output resolution while maintaining the gradation at the gradation of the target object;

wherein when generating the intermediate data corresponding to the output gradation and the output resolution, if the amount of the image data can be reduced by adjusting the gradation of the target object to the output gradation, and in a case where either: (i) the mode is disabled or (ii) the mode is enabled and the resolution of the target object is not higher than the output resolution, the second program code further causes the computer to generate the second intermediate data by adjusting the resolution to the output resolution and adjusting the gradation to the output gradation;

wherein when generating the intermediate data corresponding to the output gradation and the output resolution, if the amount of the image data cannot be reduced by adjusting the gradation of the target object to the output gradation, and in a case where either: (i) the mode is disabled or (ii) the mode is enabled and the resolution of the target object is not higher than the output resolution, the second program code further causes the computer to generate the third intermediate data by maintaining the resolution at the resolution of the target object and the gradation at the gradation of the target object; and wherein the first program code further causes the computer to:

write, based on the intermediate data that includes at least one of the first intermediate data, the second intermediate data, and the third intermediate data, the image data for the print output with the output resolution and the output gradation at a time of printing; and write, based on each of the intermediate data that includes at least one of the first intermediate data, the second intermediate data, and the third intermediate data, the image data that matches a resolution used by the confirmation display while maintaining the gradation at the gradation of the intermediate data.

5. The non-transitory computer-readable recording medium according to claim 4, wherein the second program code further causes the computer to determine whether an amount of image data in the buffer can be reduced by lowering the resolution and the gradation.

6. The non-transitory computer-readable recording medium according to claim 4, wherein if the target object includes an image object and a non-image object the second program code further causes the computer to generate specified one of the first intermediate data, the second intermediate data, and the third intermediate data for the image object, and separately generate intermediate data for the non-image object.

7. The non-transitory computer-readable recording medium according to claim 4, wherein if the mode is enabled, the second program code causes the computer to generate specified one of the first intermediate data, the second intermediate data, and the third intermediate data; and wherein if the mode is disabled, the second program code causes the computer to generate specified one of the second intermediate data and the third intermediate data and does not generate the first intermediate data.

8. An image forming method, comprising:

writing, by an image data generation unit, at least one of: (i) image data with an output resolution and an output gradation for a print output and (ii) image data for confirmation display based on intermediate data of each object included in print data, and storing the image data in a buffer;

performing, by an intermediate data generation unit, at least one of the following:

generating the intermediate data based on comparing a resolution of a target object with the output resolution, and adjusting a resolution of the intermediate data to either the resolution of the target object or the output resolution, wherein the output resolution is defined based on a size of the buffer; and generating the intermediate data based on comparing a gradation of the target object with the output gradation, and adjusting a gradation of the intermediate data to either the gradation of the target object or the output gradation, wherein the output gradation is defined based on a size of the buffer;

switching, based on an input of an operation signal for enabling or disabling a confirmation display, a mode switching unit to a mode to generate the image data for the confirmation display;

printing, by a printing unit, using the image data for print output; and displaying, by a display unit, a print preview using the image data for confirmation display, wherein the intermediate data includes first intermediate data, second intermediate data, and third intermediate data;

wherein generating, by the intermediate data generation unit, the intermediate data further comprises determining whether the mode is enabled or disabled, whether or not the resolution of the target object is higher than the output resolution, and whether or not an amount of the image data can be reduced by adjusting the gradation of the target object to the output gradation;

wherein if (i) the mode is enabled and (ii) the resolution of the target object is higher than the output resolution, generating, by the intermediate data generation unit, the first intermediate data comprises adjusting the resolution to the output resolution while maintaining the gradation at the gradation of the target object;

wherein when generating the intermediate data corresponding to the output gradation and the output resolution, if the amount of the image data can be reduced by adjusting the gradation of the target object to the output gradation, and in a case where either: (i) the mode is disabled or (ii) the mode is enabled and the resolution of the target object is not higher than the output resolution, generating, by the intermediate data generation unit, the second intermediate data by adjusting the resolution to the output resolution and adjusting the gradation to the output gradation;

wherein when generating the intermediate data corresponding to the output gradation and the output resolution, if the amount of the image data cannot be reduced by adjusting the gradation of the target object to the output gradation, and in a case where either: (i) the mode is disabled or (ii) the mode is enabled and the resolution of the target object is not higher than the output resolution, generating, by an intermediate data generation unit, the third intermediate data by maintaining the resolution at the resolution of the target object and the gradation at the gradation of the target object;

writing, based on the intermediate data that includes at least the first intermediate data, the second intermediate data, and the third intermediate data, by an image data generation unit, the image data for the print output with the output resolution and the output gradation at a time of printing; and writing, based on the intermediate data that includes at least the first intermediate data, the second intermediate data, and the third intermediate data, by an image data generation unit, the image data matching a resolution used by the confirmation display while maintaining the gradation at the gradation of the intermediate data.

9. The image forming method according to claim 8, wherein generating the intermediate data further comprises determining whether an amount of image data in the buffer can be reduced by lowering the resolution and the gradation.

10. The image forming method according to claim 8, wherein if the target object includes an image object and a non-image object, generating the intermediate data further comprises generating specified one of the first intermediate data, the second intermediate data, and the third intermediate data for the image object and generating the intermediate data separately for the non-image object.

11. The image forming method according to claim 8,
wherein if the mode is enabled, generating, by the intermediate data generation unit, the intermediate data further comprises generating specified one of the first intermediate data, the second intermediate data, and the third intermediate data; and
wherein if the mode is disabled, generating, by the intermediate data generation unit, the intermediate data further comprises generating specified one of the second intermediate data and the third intermediate data and not generating the first intermediate data.

* * * * *